(12) United States Patent
Forsblom et al.

(10) Patent No.: US 9,983,693 B2
(45) Date of Patent: May 29, 2018

(54) SPATIAL MOTION-BASED USER INTERACTIVITY

(71) Applicant: ADTILE TECHNOLOGIES, INC., San Diego, CA (US)

(72) Inventors: Nils Forsblom, La Quinta, CA (US); Angelo Scandaliato, San Diego, CA (US)

(73) Assignee: Adtile Technologies Inc., San Diego, CA (US)

( * ) Notice: Subject to any disclaimer, the term of this patent is extended or adjusted under 35 U.S.C. 154(b) by 0 days. days.

(21) Appl. No.: 14/657,638

(22) Filed: Mar. 13, 2015

(65) Prior Publication Data
US 2016/0266661 A1    Sep. 15, 2016

(51) Int. Cl.
*G06F 3/0346* (2013.01)

(52) U.S. Cl.
CPC .................. *G06F 3/0346* (2013.01)

(58) Field of Classification Search
CPC ...................................................... G06F 3/0346
See application file for complete search history.

(56) References Cited

U.S. PATENT DOCUMENTS

| 7,940,986 | B2 | 5/2011 | Mekencamp et al. |
| 8,537,231 | B2 | 9/2013 | Mekencamp et al. |
| 8,970,725 | B2 | 3/2015 | Mekencamp et al. |
| 8,971,629 | B2 | 3/2015 | Mekencamp et al. |
| 2007/0035563 | A1 | 2/2007 | Biocca et al. |
| 2007/0143068 | A1* | 6/2007 | Pasolini ............... G01C 22/006 702/160 |
| 2012/0136573 | A1* | 5/2012 | Janardhanan ........ G01C 21/165 701/512 |

FOREIGN PATENT DOCUMENTS

WO    WO2005121937    5/2005

* cited by examiner

*Primary Examiner* — Viet Pham
(74) *Attorney, Agent, or Firm* — Stetina Brunda Garred & Brucker

(57) ABSTRACT

A method for driving user interface elements on a graphical display of a mobile device based upon spatial motion input applied to a sensor unit. Motion data, which is generated by one or more motion sensors on board the sensor unit and corresponds to the spatial motion input applied to the sensor unit, is received on a data processor of the mobile device. A filter is applied to the received motion data to minimize rapid fluctuations therein. Velocity values and position values are generated based on a discrete integration of the filtered motion data. A balance between acceleration and deceleration of the sensor unit is detected, based upon an evaluation of the velocity values from a beginning of the spatial motion input and velocity values during deceleration. A deceleration response is output to the graphical display to correspond to the detected balance between acceleration and deceleration of the sensor unit.

18 Claims, 8 Drawing Sheets

SPATIAL MOTION-BASED USER INTERACTIVITY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to human-computer interfaces and mobile devices, and more particularly, to spatial motion-based user interactivity.

2. Related Art

Mobile devices fulfill a variety of roles, from voice communications and text-based communications such as Short Message Service (SMS) and e-mail, to calendaring, task lists, and contact management, as well as typical Internet based functions such as web browsing, social networking, online shopping, and online banking. With the integration of additional hardware components, mobile devices can also be used for photography or taking snapshots, navigation with mapping and Global Positioning System (GPS), cashless payments with NFC (Near Field Communications) point-of-sale terminals, and so forth. Such devices have seen widespread adoption in part due to the convenient accessibility of these functions and more from a single portable device that can always be within the user's reach.

Although mobile devices can take on different form factors with varying dimensions, there are several commonalities between devices that share this designation. These include a general purpose data processor that executes pre-programmed instructions, along with wireless communication modules by which data is transmitted and received. The processor further cooperates with multiple input/output devices, including combination touch input display screens, audio components such as speakers, microphones, and related integrated circuits, GPS modules, and physical buttons/input modalities. More recent devices also include accelerometers and compasses that can sense motion and direction. For portability purposes, all of these components are powered by an on-board battery. In order to accommodate the low power consumption requirements, ARM architecture processors have been favored for mobile devices. Several distance and speed-dependent communication protocols may be implemented, including longer range cellular network modalities such as GSM (Global System for Mobile communications), CDMA, and so forth, high speed local area networking modalities such as WiFi, and close range device-to-device data communication modalities such as Bluetooth.

Management of these hardware components is performed by a mobile operating system, also referenced in the art as a mobile platform. Currently, popular mobile platforms include Android from Google, Inc., iOS from Apple, Inc., and Windows Phone, from Microsoft, Inc. These three platforms account for over 98.6% share of the domestic U.S. market.

The mobile operating system provides several fundamental software modules and a common input/output interface that can be used by third party applications via application programming interfaces. This flexible development environment has led to an explosive growth in mobile software applications, also referred to in the art as "apps." Third party apps are typically downloaded to the target device via a dedicated app distribution system specific to the platform, and there are a few simple restrictions to ensure a consistent user experience.

User interaction with the mobile device, including the invoking of the functionality of these applications and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces in which users tap, slide, flick, pinch regions of the sensor panel overlaying the displayed graphical elements with one or more fingers, particularly when coupled with corresponding animated display reactions responsive to such actions, may be more intuitive than conventional keyboard and mouse input modalities associated with personal computer systems. Thus, minimal training and instruction is required for the user to operate these devices.

However, as noted previously, mobile devices must have a small footprint for portability reasons. Depending on the manufacturer's specific configuration, the screen may be three to five inches diagonally. One of the inherent usability limitations associated with mobile devices is the reduced screen size; despite improvements in resolution allowing for smaller objects to be rendered clearly, buttons and other functional elements of the interface nevertheless occupy a large area of the screen. Accordingly, notwithstanding the enhanced interactivity possible with multi-touch input gestures, the small display area remains a significant restriction of the mobile device user interface.

Expanding beyond the confines of the touch interface, some app developers have utilized the integrated accelerometer as an input means. Some applications such as games are suited for motion-based controls, and typically utilize roll, pitch, and yaw rotations applied to the mobile device as inputs that control a on-screen element. Along these lines, more recent remote controllers for video game console systems also have incorporated accelerometers such that motion imparted to the controller is translated to a corresponding virtual action displayed on-screen. Accelerometer data can also be utilized in other contexts, particularly those that are incorporated into wearable devices. However, in these applications, the data is typically analyzed over a wide time period and limited to making general assessments of the physical activity of a user.

Because motion is one of the most native forms of interaction between human beings and tangible objects, it would be desirable to utilize such inputs to the mobile device for controlling user interface elements thereof. Movement over extended distances can be sensed with GPS and other navigation-related modalities, while conventional accelerometer-based sensing can be used for sensing small movements of relatively short duration. However, there is a need in the art for spatial motion-based user interactivity that bridges the gap between these different modalities to provide a more immersive experience. It would also be desirable implement such interactivity on mobile devices on a universal basis for third party app developers to utilize.

BRIEF SUMMARY

The present disclosure is directed to various methods for spatial motion-based user interactivity. One embodiment contemplates a method for driving user interface elements on a graphical display of a mobile device based upon spatial motion input applied to a sensor unit. The method may include receiving motion data on a data processor of the mobile device. The motion data may be generated by one or more motion sensors on board the sensor unit and connected to the data processor. Furthermore, the motion data may correspond to the spatial motion input applied to the sensor unit. The method may also include applying, with the data processor, a filter to the motion data received thereby to minimize rapid fluctuations in the received motion data. There may also be a step of generating, with the data processor, velocity values and position values based on a discrete integration of the filtered motion data. The method may further include a step of detecting a balance between acceleration and deceleration of the sensor unit. This detection may be based upon an evaluation of the velocity values from a beginning of the spatial motion input and velocity values during deceleration. The method may also incorporate a step of modifying, on the data processor, a deceleration response that may be output to the graphical display to correspond to the detected balance between acceleration and deceleration of the sensor unit.

Another embodiment of the present disclosure is directed to a spatial motion user interface method. The method may include receiving, on a data processor, acceleration data from an accelerometer sensor that is in communication with the data processor. The acceleration data may correspond to the spatial motion. Additionally, there may be a step of applying a filter to the received acceleration data. If the acceleration data is evaluated to have an increasing trend and increases beyond a dynamic threshold gap, the method continues with triggering a step count. Furthermore, in response to the triggered step count, the method may include a step of generating a user interface display action corresponding to a direction of the spatial motion.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The present disclosure contemplates various embodiments of user interfaces based upon capturing spatial motion applied to mobile devices. The simulation of medium- to long-range motion is envisioned, providing a more immersive user experience. These user interfaces may embody methods for processing captured spatial input to drive corresponding functions performed on the mobile device. These methods may be implemented as executable software instructions. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
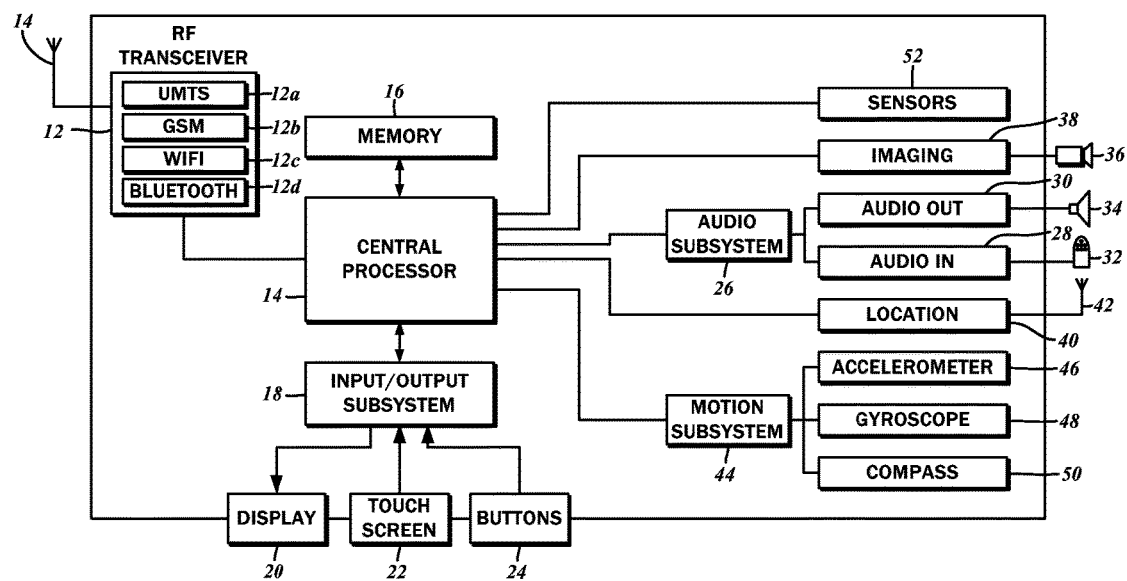
FIG. 1 is a block diagram illustrating the components of a mobile device utilized in various embodiments of the present disclosure.

FIG. 1 illustrates one exemplary mobile device 10 on which various embodiments of the present disclosure may be implemented. The mobile device 10 may be a smartphone, and therefore include a radio frequency (RF) transceiver 12 that transmits and receives signals via an antenna 14. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12b. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12c and a Bluetooth module 12d. The enumeration of various wireless networking modules is not intended to be limiting, and others may be included without departing from the scope of the present disclosure.

The mobile device 10 is understood to implement a wide range of functionality through different software applications, which are colloquially known as "apps" in the mobile device context. The software applications are comprised of pre-programmed instructions that are executed by a central processor 14 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile device 10. Additionally, there may be other buttons and switches for controlling volume, limiting haptic entry, and so forth. Those having ordinary skill in the art will recognize other possible input/output devices that could be integrated into the mobile device 10, and the purposes such devices would serve. Other smartphone devices may include keyboards (not shown) and other mechanical input devices, and the presently disclosed interaction methods with the graphical user interface detailed more fully below are understood to be applicable to such alternative input modalities.

The mobile device 10 includes several other peripheral devices. One of the more basic is an audio subsystem 26 with an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. Furthermore, it is possible to capture still images and video via a camera 36 that is managed by an imaging module 38.

Due to its inherent mobility, users can access information and interact with the mobile device 10 practically anywhere. Additional context in this regard is discernible from inputs pertaining to location, movement, and physical and geographical orientation, which further enhance the user experience. Accordingly, the mobile device 10 includes a location module 40, which may be a Global Positioning System (GPS) receiver that is connected to a separate antenna 42 and generates coordinates data of the current location as extrapolated from signals received from the network of GPS satellites. Motions imparted upon the mobile device 10, as well as the physical and geographical orientation of the same, may be captured as data with a motion subsystem 44, in particular, with an accelerometer 46, a gyroscope 48, and a compass 50, respectively. Although in some embodiments the accelerometer 46, the gyroscope 48, and the compass 50 directly communicate with the central processor 14, more recent variations of the mobile device 10 utilize the motion subsystem 44 that is embodied as a separate co-processor to which the acceleration and orientation processing is offloaded for greater efficiency and reduced electrical power consumption. One exemplary embodiment of the mobile device 10 is the Apple iPhone with the M7 motion co-processor.

The components of the motion subsystem 44, including the accelerometer 46, the gyroscope 48, and the compass 50, while shown as integrated into the mobile device 10, may be incorporated into a separate, external device. This external device may be wearable by the user and communicatively linked to the mobile device 10 over the aforementioned data link modalities. The same physical interactions contemplated with the mobile device 10 to invoke various functions as discussed in further detail below may be possible with such external wearable device.

There are other sensors 52 that can be utilized in the mobile device 10 for different purposes. For example, one of the other sensors 52 may be a proximity sensor to detect the presence or absence of the user to invoke certain functions, while another may be a light sensor that adjusts the brightness of the display 20 according to ambient light conditions. Those having ordinary skill in the art will recognize that other sensors 52 beyond those considered herein are also possible.

As briefly mentioned above, various embodiments of the present disclosure contemplate user interfaces that utilize spatial motion applied to the mobile device 10. In general, the mobile device 10 is contemplated to mirror the motion in physical space by tracking its velocity and position in a virtual space. These physical space motions can result in a corresponding movement within the virtual space, and trigger various on-screen elements and other related functionality. According to one implementation, this functionality may be implemented as an independent software module not tied to any specific app such that other developers may integrate the same spatial motion-based user interface therein. The module can then be adapted for numerous application contexts, including mobile advertising, gaming, robotics, unmanned aerial vehicles, and so forth. Any application of virtual reality or augmented reality can utilize these modules, such as in fashion, science, real estate, and any other public space where a three-dimensional representation thereof can assist the user in navigation. For example, shopping malls, airports, train and bus stations and the like may be presented and navigated by the user with the disclosed spatial motion-based user interface.

Generally, motion input that can be imparted on the mobile device 10 falls into one of three categories defined by the relative range or distance of the motion, each of which require different modalities to accurately capture with the correct scale and sensitivity. At one end of the distance spectrum are short-range motions, which are constrained to arms-length distances of the user. Typically, these motions are limited to rotation of the mobile device about one or more axes, and require highly precise feedback from the on-board accelerometer 46. Further up the spectrum in terms of or distance is medium-range motion, which encompasses motion that is within a walking distance such as within a home or office. The present disclosure contemplates various methods and systems for accurately translating such medium-range motion to a virtual environment, and will be described in further detail below. Finally, there are long-range motions that are typically understood to be greater than walking distance, and require GPS data from the location module 40 to detect. In conjunction with the other motion detection modalities, activation of the GPS tracking may be incorporated hierarchically with it being gradually phased in after the limits of the medium-range motions are reached. One of the contemplated embodiments is directed to navigation within a virtual space, and in such an implementation, multiple local environments may be combined into a larger scale space.

Figure 2A:
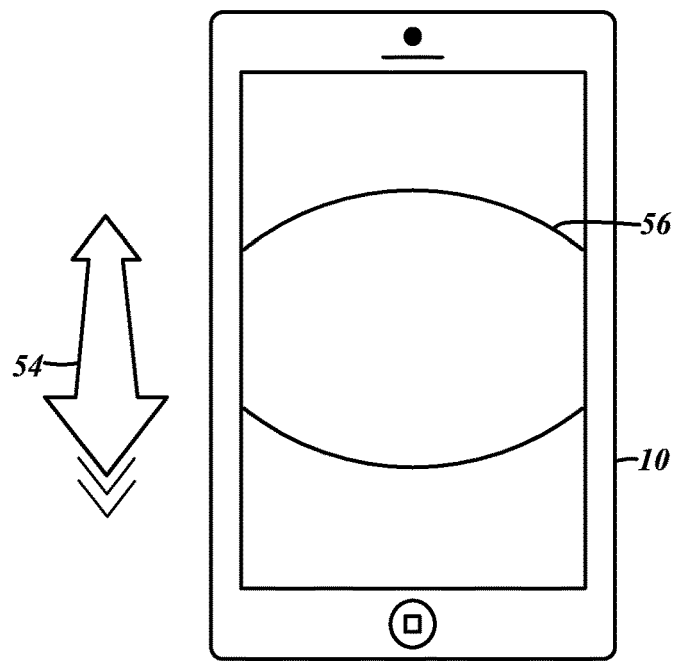
FIGS. 2A-2B depict an exemplary spatial motion-based user interface in which graphics are zoomed in and out based on forward and rearward motion.
Figure 2B:
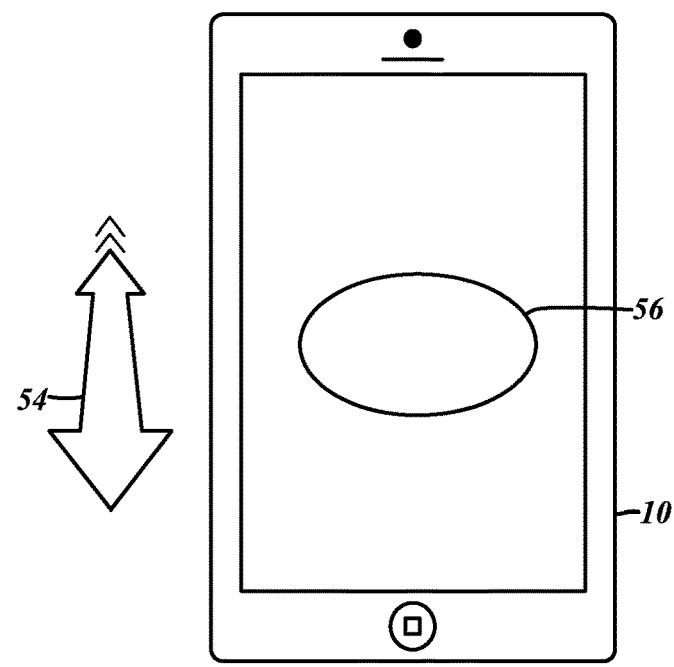

With reference to the exemplary screen displays of FIGS. 2A-2B, one exemplary application of the spatial motion-based user interface of the present disclosure contemplates a graphical display of the mobile device 10 being zoomed in by moving it forward and backwards (or towards and away from the user) along a movement axis 54. More particularly, the mobile device 10 may be moved closer to the user to zoom in, such that a displayed graphic element 56 is enlarged and occupies a greater part of the display 20, and moved further away from the user to zoom out, such that the graphic element 56 is reduced. Those having ordinary skill in the art will recognize other interactions that are possible, such as the motion of the mobile device 10 in space being translated to positioning/stroking a virtual paintbrush, and so forth.

This interaction may be implemented with the various sensors that are functionally integrated with the mobile device 10. In particular, one exemplary embodiment utilizes the accelerometer 46, though it may also be possible to supplement the data therefrom with additional data from the gyroscope 48 that detects the physical orientation of the mobile device 10. A preferred, though optional embodiment utilizes only the accelerometer 46, as most conventional mobile devices 10 implement the functionality of removing the gravity component of acceleration natively on the mobile device 10. With reference to the flowchart of FIG. 3, the method for processing captured spatial input may include a step 200 of receiving motion data generated by one or more motion sensors. In this context, motion sensors may refer to the aforementioned accelerometer 46, as well as the gyroscope 48, the compass 50, as well the location module 40 in some cases. All or some of these components are generally understood to be disposed on a sensor unit, which in most embodiments of the mobile device 10 is integral with the other circuitry thereof. However, in some embodiments, the sensor unit may be disposed on a physically separate circuit, or on a wearable device that is not part of the mobile device 10 and only communicating therewith. Examples of such wearable devices include smart watches that have touch display screens and on-board motion sensors that communicate directly with the mobile device 10. The received motion data is understood to correspond to the spatial motion input applied to the sensor unit.

Figure 4:
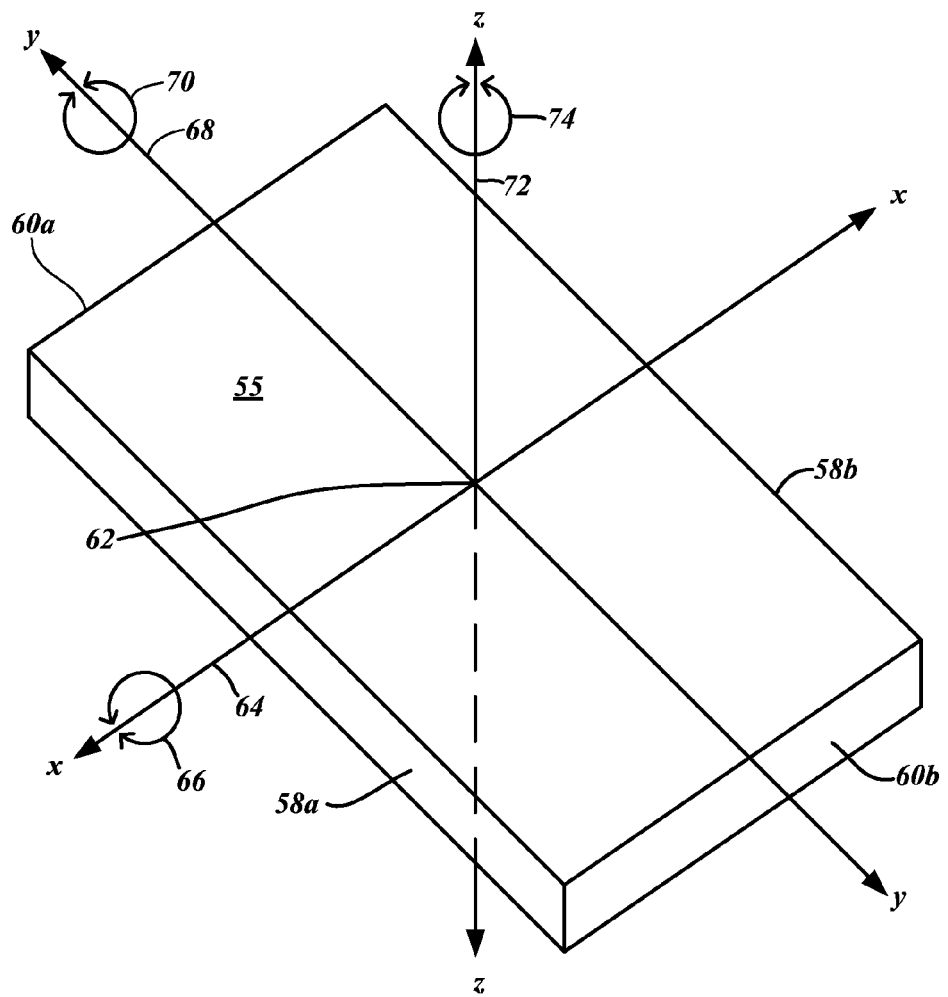
FIG. 4 shows the mobile device and the rotation axes thereof.

As shown in diagram of FIG. 4, the mobile device 10 may be moved about different axes of rotation. The mobile device 10 is generally defined by a front face 55, opposed side edges 58a, 58b, and opposed top and bottom edges 60a, 60b. Extending through a center 62 from the side edge 58a to the side edge 58b in a parallel relationship to the top and bottom edges 60a, 60b, is an x-axis 64. An angular rotation 66 of the mobile device 10 about the x-axis 64 may also be referred to as pitch. Likewise extending through the center 62 but from the top edge 60a to the bottom edge 60b in a parallel relationship to the side edges 58a, 58b is a y-axis 68, with an angular rotation 70 about the y-axis 68 being referred to as roll. Finally, extending outwardly from the front face 55 and perpendicular to both the x-axis 64 and the y-axis 68 is a z-axis 72. The rotation 74 about the z-axis 72 is referred to as yaw. The accelerometer 46 is understood to report the combination of pitch, roll, and yaw acceleration.

The relationship between the acceleration of the mobile device 10 and its velocity in space, as well as an analogous relationship between the velocity and device position are defined using upon standard calculus techniques. The raw data from the accelerometer 46 may thus be transformed into the approximate velocity and position coordinates of the mobile device 10 in space relative to its initial velocity and position.

Figure 5A:
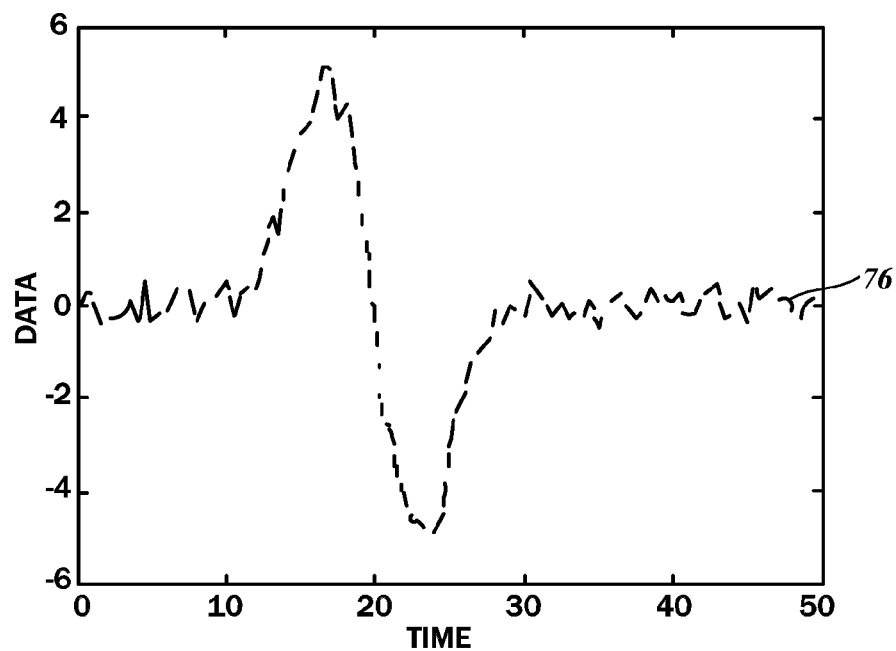
FIGS. 5A-5C are graphs plotting motion sensor data over time after different processing steps, with FIG. 5A showing raw sensor data, FIG. 5B showing smoothed sensor data, and FIG. 5C showing integration of the smoothed sensor data.
Figure 5B:
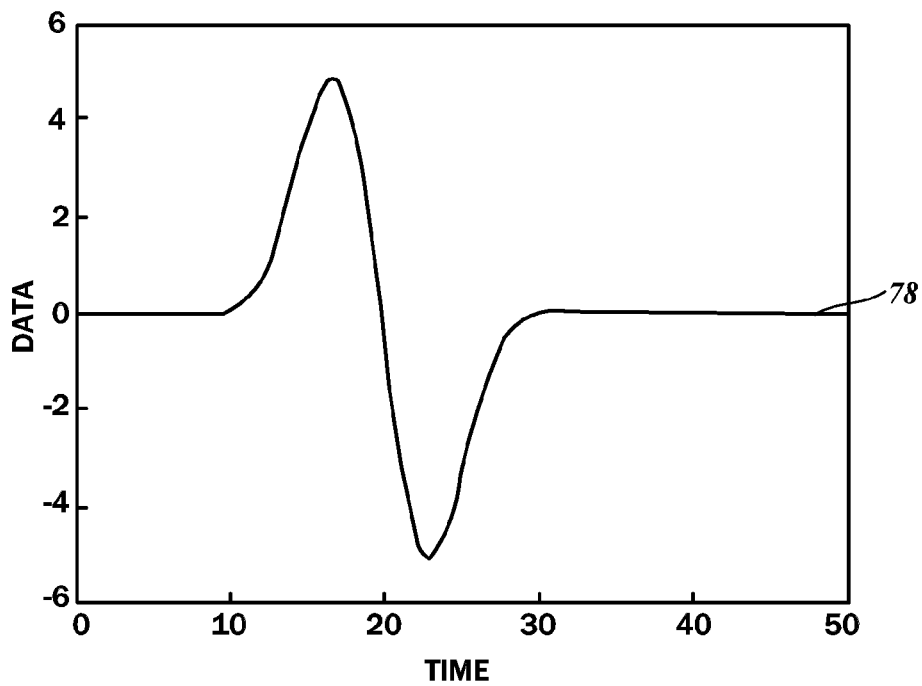

The accelerometer 46 of conventional mobile devices 10 only samples the acceleration in discrete time packets, and this data is subject to potentially large measurement errors. Accordingly, some level of pre-processing may be needed to reduce such measurement errors. Returning to the flowchart of FIG. 3, the method for processing captured spatial input incorporates a step 210 of applying a low-pass filter to the received motion data. FIG. 5A is of an exemplary plot 76 of the data from the accelerometer 46 over time, and shows much noise. The data stream is not continuous, as it is provided in discrete time packets. The low pass filter is understood to smooth these fluctuations, such as shown in a plot 78 of FIG. 5B. Additionally, moving averages of the received data may be utilized to further minimize large fluctuations of value. Some extent of predictive weighting to the received data stream may also be applied, such that the momentum of previous measurements/data points is used for smooth predictions of subsequent measurements/data points.

Figure 5C:
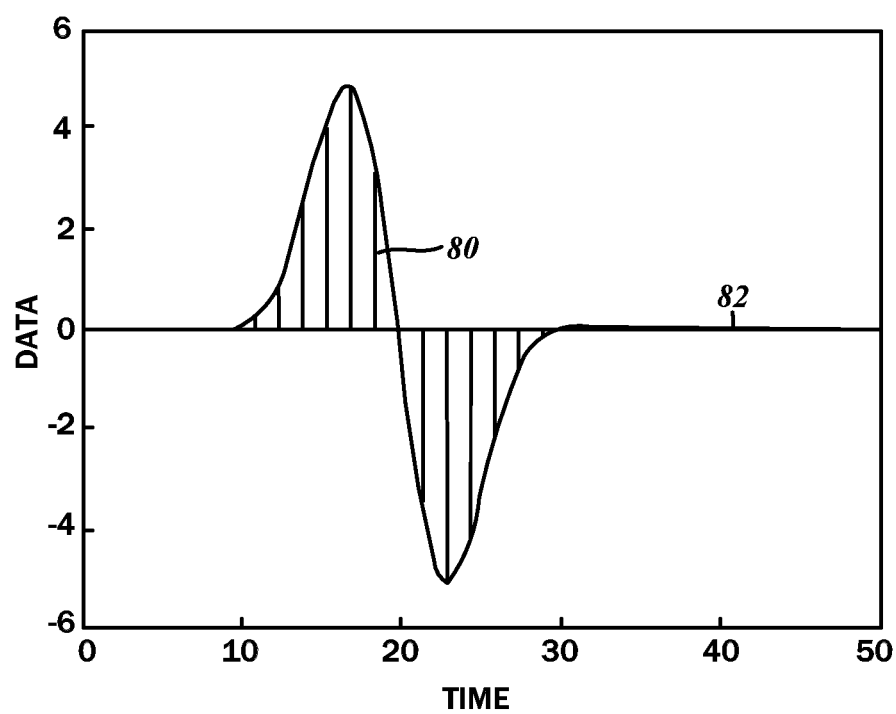

Recovery of an approximation of the velocity of the mobile device 10 from the smoothed/filtered acceleration data involves discrete integration as shown in FIG. 5C. In this regard, the method for processing capturing spatial input contemplates a step 220 of integrating the filtered motion or accelerometer data to generate velocity and position values. As a computational technique, discrete integration approximates analytic integration, which involves the accumulation of each of the values 80 of the signal shown as plot 82, whether it is the smoothed motion data or the recovered velocity values over time. The position of the mobile device 10 is approximated with discrete integration of the recovered velocity.

In order to provide a reasonable estimate of the velocity or position of the sensor unit or mobile device 10 in virtual space, a balance between acceleration and deceleration is useful. For example, when the mobile device 10 is moved in a straight line and set in motion, it is accelerated until a desired speed is reached. When the mobile device 10 stops moving, deceleration occurs at the same rate, but in the opposite direction as when it is accelerated into motion. The motion data typically does not reflect this reality, so various embodiments contemplate the detection of when the user may perceive that acceleration and deceleration should be balanced. Based upon this detection, the balance of acceleration and deceleration is corrected so that the user interface does not generate an output in which there is an artificial drift in the virtual space. Therefore, the user is able to control the position and velocity of the mobile device 10 with a more natural response.

Figure 3:
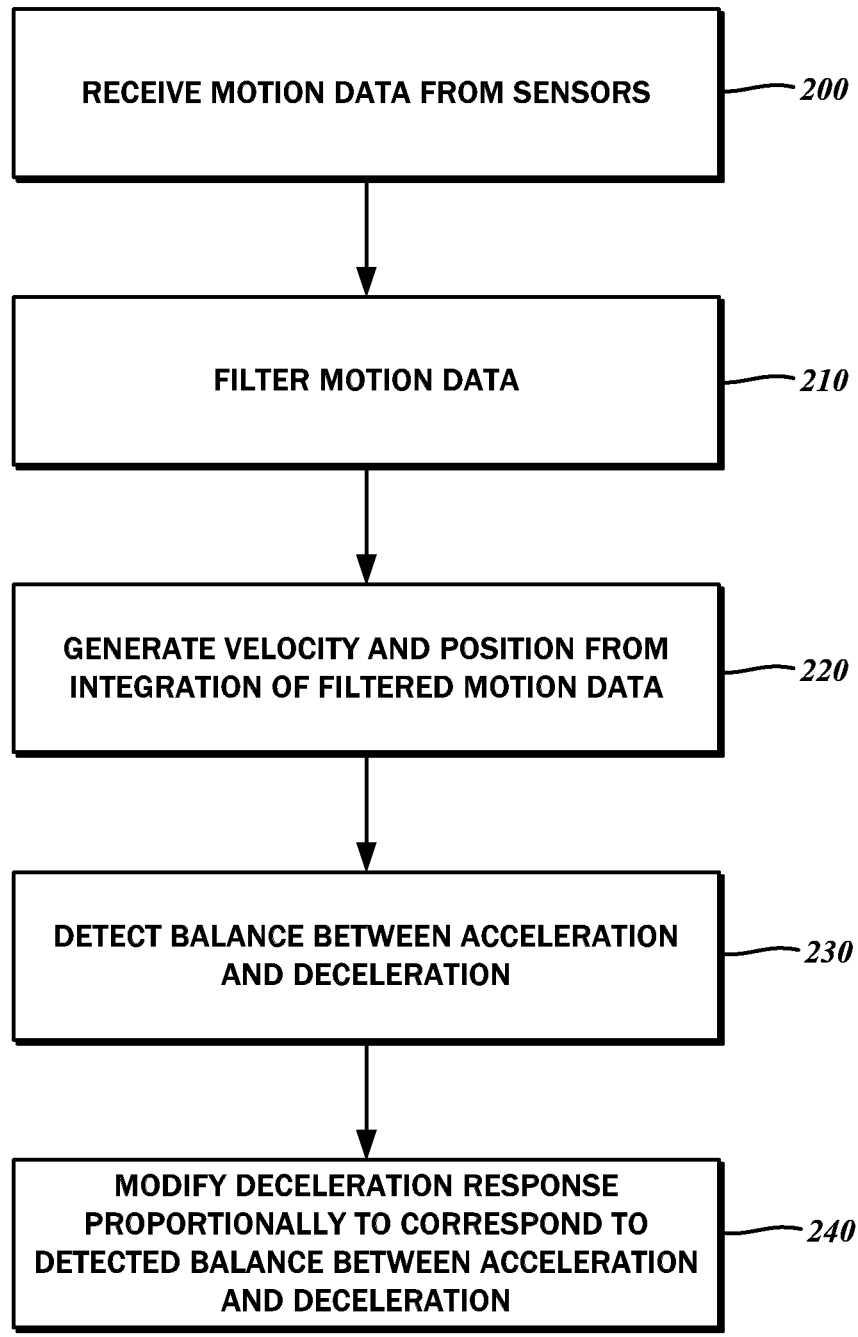
FIG. 3 is a flowchart illustrating one method for driving user interface elements on a graphical display of the mobile device based upon spatial motion input.

Referring again to the flowchart of FIG. 3, the method continues with a step 230 of detecting a balance between the acceleration motion and the deceleration motion, relative to the initial motion. More particularly, the velocity values from the initial acceleration are compared against current deceleration-related velocity values. If they are nearly opposite, (within a predetermined tolerance level), the deceleration response is modified in a step 240 to proportionally correspond to or cancel out the acceleration velocity. This procedure is understood to be anisotropic, and limited to the scope of each individual motion input. As such, there is no overall tendency to move in one particular direction over the duration of several isolated motion inputs.

As mentioned above, the low pass filter applied to the raw accelerometer sensor data is understood to smooth the fluctuations. However, slow motions that are characterized by such low-level fluctuations may result in being filtered out. The deceleration at the end of such slow motions are typically quick, so there may be a "kick-back" effect that results in a response that is opposite the direction of the motion input. The kick-back motion is detected as a sharp acceleration without deceleration, and thereby suspends the mobile device 10 in a high velocity motion through virtual space even when there is no movement in the physical space. According to one embodiment, safeguarding against such kick-back effects involves checking whether a motion input remains sustained over a predetermined time period, or counteracted by an immediate acceleration. These evaluations are understood to prevent a response in which a long-term high velocity movement is output.

Figures 6A, 6B:
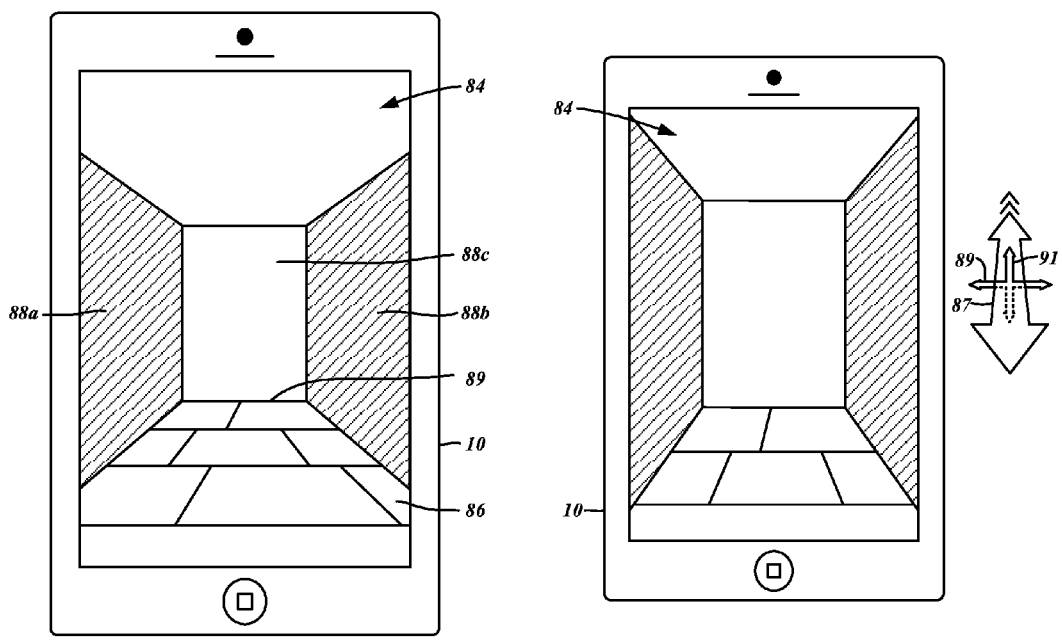
FIGS. 6A-D depict another embodiment of the spatial motion-based user interface for navigating a virtual three-dimensional environment.
Figure 6C:
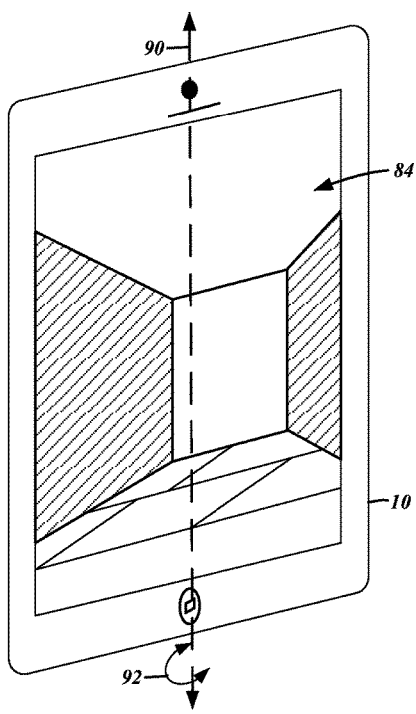
Figure 6D:
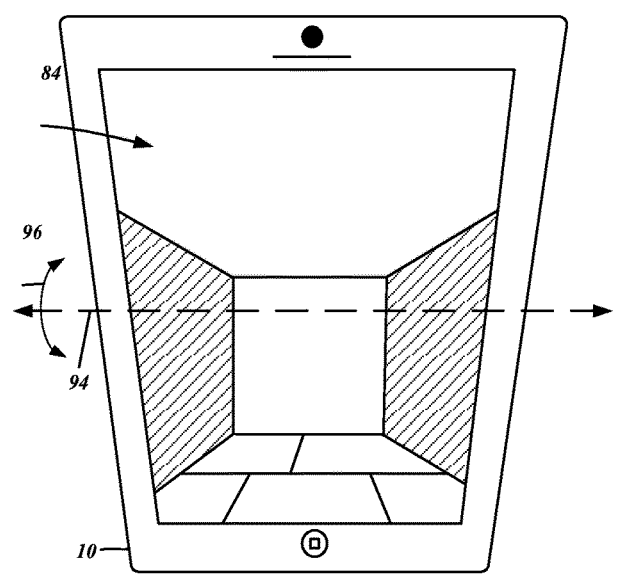

With reference to FIG. 6A, another embodiment of the present disclosure may, for example, involve is a virtual three-dimensional environment 84 that is presented from a first person perspective. The environment 84 is generally defined by a floor 86, along with multiple walls 88 that are segregated from the floor 86 with a horizon 89. In the simplified example, there may be a left wall 88a, an opposite right wall 88b, and a rear wall 88c. This is not intended to be limiting, and other three-dimensional structures may be incorporated and presented with different textures. It is possible for the user to spatially navigate within the virtual environment 84 based upon various motions imparted to the mobile device 10. For example, as depicted in FIG. 6B, it is possible to "walk" forwards and backwards through the virtual environment 84 by moving the mobile device 10 forward and backwards along a movement axis 87. Without changing the viewing angle of the scene, it is also possible for the user to jump up or crouch down, as well as walking sideways, with the view perspective being correspondingly adjusted along an x-axis 89 and a y-axis 91. Furthermore, as depicted in FIG. 6C, the view may be panned left and right about a vertical axis 90 of the display along a panning path 92. FIG. 6D depicts the view being rotated upwards and downwards about a horizontal axis 94 along a panning path 96. It is understood that view may be rotated 360 degrees in every direction.

The graphics that make up the environment 84 may be rendered with OpenGL, though any suitable rendering technology may be readily substituted without departing from the scope of the present disclosure. The environment 84 may be web-based, so one possible implementation is with Javascript scripts that may be executed by client-side web browsers or application environments that can render standard web content. The general three-dimensional rendering script may be embodied as one downloadable object or module, while the specifics of the environment 84 may be programmed into another downloadable object or module.

Navigation through the environment 84 may involve medium-range motion mentioned above, and a pedometer-type sensing is utilized to detect and quantify such medium-range motion. Generally, pedometers count the steps taken by the user, and when a step is so counted, the graphic rendering engine is triggered to generate a predefined virtual output that corresponds to the step. The user's motion can be simulated in real-time on the mobile device 10, and as will be described in further detail below, a smooth, natural experience is envisioned. Accordingly, the mobile device is capable of accurately capturing steps of different lengths and speeds, and all steps or inputs are counted in real-time that results in an immediate response.

Again, the pedometer modality utilizes the data reported by the accelerometer 46 to sense the stepping motion of the user. Although typical implementations of accelerometer-based pedometers must account for an unknown orientation, in the virtual three-dimensional environment, it is understood that the user will be holding the device in a comfortable, upright viewing position, and thus a specific orientation is assumed, though with the possibility of a slight degree of pitch. In this orientation, the y-axis accelerometer measures linear acceleration in the vertical direction. The acceleration in the direction of gravity is deemed unneeded and therefore not calculated. In a typical step, vertical acceleration is understood to decrease as the forward leg swings out from under the body until the heel contacts the floor. As the back leg swings from the initial rearward position to under the body, vertical acceleration again increases. These acceleration characteristics are understood to be adequate indicators of a complete step.

The acceleration data from the accelerometer 46 is understood to have a significant degree of oscillation along with both high frequency noise and low frequency noise. To smooth the incoming acceleration data signal, a filter is applied thereto. In accordance with one embodiment, the filter is a second-order central three-point filter defined as: $\tilde{y}_t = \frac{1}{4} y_{i-1} + \frac{1}{2} y_i + \frac{1}{4} y_{i+1}$. Alternatively, for a more aggressive smoothing filter, a first-order central five-point filter or simple moving average filter, defined as $\tilde{y}_t = \frac{1}{5}(y_{i-2} + y_{i-1} + y_i + y_{i+1} + y_{i+2})$, may also be utilized.

A step is counted when the refined y-acceleration $\tilde{y}_t$ is increasing and increases beyond a dynamic threshold gap $[\hat{y}-h, \hat{y}+h]$. These events must occur within four data points since the increase in the y-acceleration of an actual step is assumed to be relatively immediate. The dynamic threshold $\hat{y}$ can be defined as the average of the sample maximum and sample minimum, thus: $\hat{y} = \tilde{y}_{max} + \tilde{y}_{min}/2$. The maximum and minimum acceleration values may be recalculated every twenty data points, though this is by way of example only and not of limitation. This varying threshold is understood to be robust and allows for accurate step counting during slow walking as well as fast running speeds. The sampling window of twenty data points is understood sufficiently large to capture extreme values, and short enough for changes in the walking pattern.

According to one embodiment, the dynamic gap h is utilized for precluding noise from being counted as false steps. As h decreases, the triggering of a step count becomes more sensitive. On the other hand, as h increases, the triggering of a step count becomes less sensitive. The gap h is thus increased to a maximum value when $\tilde{y}_{max}$ is equal to the standard noise amplitude. Based upon an analysis of the noise level while stationary and slow walking, a maximum dynamic gap $h_{max}$ of 0.23 has been proven adequate for preventing false step counts. The dynamic gap may be defined as $$h = \begin{cases} \left(\frac{h_{max}}{\tilde{y}_{max}}\right) h_{max} & \text{if } \tilde{y}_{max} > h_{max} \\ h_{max}, & \text{else} \end{cases}$$

Thus, an increase in $\tilde{y}_{max}$, results in the gap h decreasing toward zero. In this embodiment, the steps are accumulative, that is, if a new step is taken/counted before the previous step is completed, the newly taken step is added to the speed of the previous step, mimicking the experience of jogging at higher speeds.

The foregoing pedometer modality has been described in relation to forward movement, but as has been explained, the y-axis accelerometer data is utilized so the method is understood to be applicable to rearward movement as well as sideways and diagonal movement. To ascertain direction, different components of the accelerometer data, namely, the x-axis components and the z-axis components are utilized. This data can be combined to determine the directional vector in which the step was taken. Accordingly, the virtual camera that renders the virtual reality environment 44 or the scene, allows movement in any direction. In one embodiment, the magnitude of the x and z axis components are utilized. Alternative embodiments contemplate pattern recognition modalities in which different types of steps are distinguished based upon an analysis of the accelerometer data signal shapes. Along these lines, jumping and ducking responses can be generated based upon an analysis of the magnitude and signal shape characteristics of the y-axis accelerometer data.

In the various embodiments of the present disclosure, it is possible for the user to pan vertically and laterally within the environment 84. According to one implementation, the gyroscope 48, which will be recognized as a device that measures angular acceleration of the mobile device 10, is utilized. Furthermore, it is possible to utilize pattern recognition of the gyroscope data signal for ascertaining panning inputs from the user. Continuing with the aforementioned web-based implementation, the executable instructions implementing the user interface may be included in Javascript module that is different from the previously indicated downloadable object or module including instructions for OpenGL/three-dimensional rendering. The gyroscope 48 returns absolute Eulerian angles, e.g., pitch, yaw, and roll. The yaw and roll data are converted to an absolute heading. The heading corresponds to a turning the view left and right as demonstrated in FIG. 6C, and pitch corresponds to an up and down viewing as demonstrated in FIG. 6D. Because the measurements from the gyroscope 48 are similarly fraught with noise and oscillation, it is possible to apply a filter thereto such as the aforementioned five-point moving average type.

When the mobile device 10 is stationary but the view is being panned or rotated, steps are not to be counted, and the pedometer module is not to misread acceleration measurements as steps. This may be achieved by including a further condition of a total rotation amount being less than a predefined threshold in order for the step to be counted. In further detail, during each step iteration, the change in pitch, or $\Delta$pitch, which is given as $pitch_i - pitch_{i-1}$, as well as the change in heading, or $\Delta$heading, which is given as $heading_i - heading_{i-1}$, are measured. For a step to be counted, $\Delta$pitch must be less than a certain predefined value, e.g., $|\Delta pitch| < pitch_{crit}$, and $\Delta$heading must be less than a predefined value, e.g., $|\Delta heading| < heading_{crit}$. The threshold or critical value of pitch, $pitch_{crit}$ may be 0.014 according to one embodiment of the present disclosure, while the threshold or critical value of heading, $heading_{crit}$ may be 0.1. However, it will be recognized by those having ordinary skill in the art that these specific values are by way of example only and not of limitation.

Thus, during regular walking, panning is not understood to affect step counts. Should the heading and pitch constraints be active during walking, it is possible to miss actual steps. Correction of this discrepancy may be accomplished with ignoring the defined constraints when the current step is detected within 20 samplings of the previous step. This function can be extended to distinguish between different movement, such as jogging, running, or other rhythmic step patterns.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for driving user interface elements on a graphical display of a mobile device based upon spatial motion input applied to a sensor unit, the method comprising:
   receiving, on a data processor of the mobile device, motion data generated by one or more motion sensors on board the sensor unit and connected to the data processor, the motion data corresponding to the spatial motion input applied to the sensor unit;
   applying, with the data processor, a filter to the motion data received thereby to minimize rapid fluctuations in the received motion data;
   generating, with the data processor, velocity values and position values based on a discrete integration of the filtered motion data;
   reducing artificial drift based upon detecting a balance between acceleration and deceleration of the sensor unit over one continuous spatial motion input by comparing the velocity values from a beginning of the one continuous spatial motion input and velocity values during deceleration at the end of the one continuous spatial motion input and modifying, on the data processor, a deceleration response output to the graphical display to correspond to the detected balance between acceleration and deceleration of the sensor unit.

2. The method of claim 1, further comprising:
   comparing a duration of acceleration to a first predetermined time threshold.

3. The method of claim 2, further comprising:
   generating an acceleration response output to the graphical display if the duration of acceleration exceeds the first predetermined time threshold.

4. The method of claim 2, further comprising:
   generating an acceleration response output to the graphical display if the duration of acceleration is below the first predetermined time threshold and a deceleration input is detected within a second predetermined time threshold.

5. The method of claim 1, wherein the one or more sensors is an accelerometer.

6. The method of claim 1, wherein the one or more sensors is a gyroscope.

7. The method of claim 1, wherein the one or more sensors is a combination of an accelerometer and a gyroscope.

8. The method of claim 1, wherein the sensor unit is integrated into the mobile device.

9. The method of claim 1, wherein the filter is a low pass filter.

10. The method of claim 1, wherein the sensor unit is separate from the mobile device.

11. An article of manufacture comprising a non-transitory program storage medium readable by a mobile device, the medium tangibly embodying one or more programs of instructions executable by the device to perform a method for driving user interface elements on a graphical display of the mobile device based upon spatial motion input applied thereto, the method comprising:
   receiving, on a data processor of the mobile device, motion data generated by one or more motion sensors on board the sensor unit and connected to the data processor, the motion data corresponding to the spatial motion input applied to the sensor unit;
   applying, with the data processor, a filter to the motion data received thereby to minimize rapid fluctuations therein;

generating, with the data processor, velocity values and position values based on a discrete integration of the filtered motion data;

reducing artificial drift based upon detecting a balance between acceleration and deceleration of the sensor unit over one continuous spatial motion input by comparing the velocity values from a beginning of the one continuous spatial motion input and velocity values during deceleration at the end of the one continuous spatial motion input and modifying, on the data processor, a deceleration response output to the graphical display to correspond to the detected balance between acceleration and deceleration of the sensor unit.

12. A spatial motion user interface method, comprising:

receiving, on a data processor, acceleration data from an accelerometer sensor in communication with the data processor, the acceleration data corresponding to the spatial motion;

applying a filter to the received acceleration data;

assuming a single directional component of the acceleration data corresponds to linear acceleration along a gravitational axis;

if the single directional component of the acceleration data is evaluated to have an increasing trend and increases from below a dynamic threshold gap to beyond the dynamic threshold gap, triggering a step count, the dynamic threshold gap being correlated to a step count triggering sensitivity; and in response to the triggered step count, generating a user interface display action corresponding to a direction of the spatial motion.

13. The method of claim 12, wherein the filter is a second-order central three-point filter.

14. The method of claim 12, wherein the filter is a first-order central five-point filter.

15. The method of claim 12, wherein the step count is triggered if the acceleration data increases beyond the dynamic threshold gap within a predefined number of data points.

16. The method of claim 12, wherein the dynamic threshold gap is defined as a pair of maximum and minimum values of a dynamic threshold and a dynamic gap.

17. The method of claim 16, wherein the dynamic threshold is an average of an acceleration data sample maximum and an acceleration data sample minimum over a window of a predefined number of data points.

18. The method of claim 16, wherein the dynamic gap is approximately 0.23.

* * * * *